W. M. HARTT.
FEEDING DEVICE.
APPLICATION FILED JUNE 7, 1915.

1,190,892.

Patented July 11, 1916.

WITNESSES:
J. C. Barry
H. E. Beck

INVENTOR
William M. Hartt
BY Munn & Co.
ATTORNEYS

UNITED STATES PATENT OFFICE.

WILLIAM M. HARTT, OF GREAT FALLS, MONTANA.

FEEDING DEVICE.

1,190,892.  Specification of Letters Patent.  Patented July 11, 1916.

Application filed June 7, 1915. Serial No. 32,603.

*To all whom it may concern:*

Be it known that I, WILLIAM M. HARTT, a citizen of the United States, and a resident of Great Falls, in the county of Cascade and State of Montana, have invented an Improvement in Feeding Devices, of which the following is a specification.

This invention relates to feeding devices, and more particularly to a sanitary poultry feeder.

The primary object of the invention is to provide a device wherein means are provided, in the form of medicated pads, for preventing the spread of diseases prevalent among poultry, said pads being so arranged that the feet and heads of the fowls, when feeding, will come into contact therewith.

Another object of the invention is the provision of superposed perches or supports so arranged in order that fowls of different sizes may readily gain access to the feed receptacle, the uppermost perches being adjustable.

A still further object is to provide a device of this character in which the feed receptacle is provided with hinged covers and carried by a swinging frame in order to permit of the receptacle being readily emptied and the parts of the device cleansed when necessary.

The inventive idea involved is capable of receiving a variety of mechanical expressions one of which, for the purpose of illustrating the invention, is shown in the accompanying drawing in which—

Figure 1:
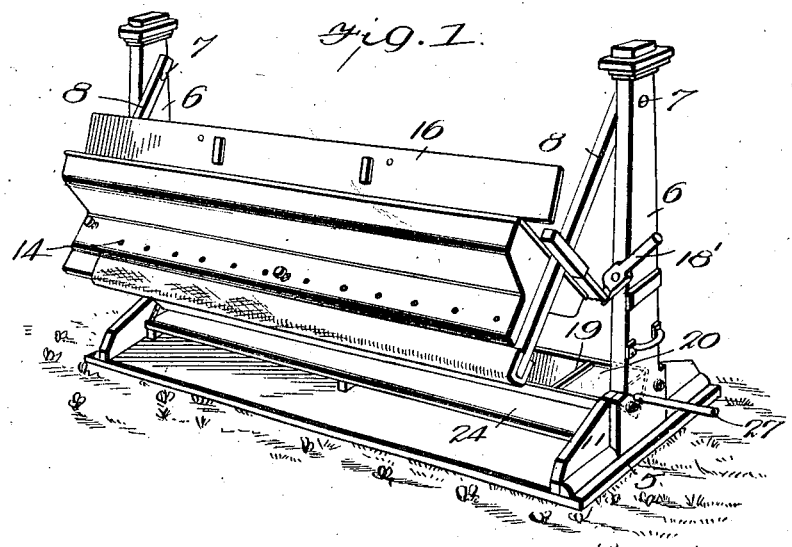
Figure 2:
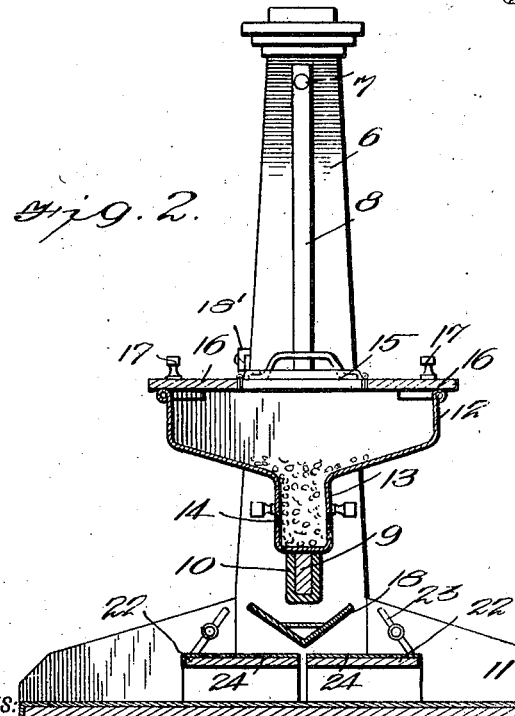

Figure 1 is a perspective view of the device showing the feed receptacle tilted. Fig. 2 is a vertical cross sectional view thereof showing the feed device in its normal position.

Referring more particularly to the accompanying drawing in which like reference characters designate similar parts, the numeral 5 indicates the base of the device which is preferably of rectangular formation and has at each end thereof the standards 6. A U-shaped frame is pivoted as indicated at 7 adjacent the upper end of the standards 6 and comprises the vertical members 8 and the horizontal member 9 connecting the lower ends of said vertical members. A medicated pad 10 embraces the horizontal member 9 and is secured thereto as shown. The base 5 is also provided on its upper surface with a medicated pad 11, said pad being for a purpose which will hereinafter appear.

Secured in the U-shaped frame in any manner preferable and between the vertical members 8 thereof is a feed receptacle 12 preferably made of metal. Said receptacle has its lower portion reduced longitudinally so that in cross section the receptacle is substantially of Y-shaped formation, the bottom thereof resting upon the horizontal member 9 of the frame. The reduced portion 13 of the receptacle is provided with a plurality of openings 14 on each side thereof whereby the poultry may have access to the feed in the receptacle when standing upon the pad 11 which forms the lowermost perch. The cover for the receptacle 12 comprises a central portion 15 having the lids 16 hinged thereto along its longitudinal edges, said hinged lids being provided with suitable knobs 17 whereby the same may be readily elevated in order to gain access to the interior of the receptacle. A latch 18' is pivoted to one of the standards 6 and is adapted to be swung into the path of movement of the receptacle 12 and engage the same after it has been tilted to the position shown in Fig. 1, thereby retaining the same in this position when it is desired to empty the contents of the receptacle and cleanse the same.

Arranged directly below the portion 13 of the receptacle 12 and extending longitudinally of the base 5 is a trough 18 which is V-shaped in cross section and secured to the standards 6. This trough is adapted to catch any feed which may drop through the openings 14 of the receptacle thereby preventing any waste of feed. The trough 18 is provided adjacent one end thereof with a partition 19 for forming a water compartment 20 therein, said compartment being filled by means of a feed pipe 21 passing through the adjacent standard.

Elevated perches 22 are carried by the base 5 and extend longitudinally thereof on each side of the trough 18, said perches being provided to accommodate small fowl and permit the same to feed from the trough and also the receptacle. These perches 22 may be adjusted transversely of the base 5 and are secured in their adjusted positions by means of suitable keys 23 pivoted to the standards 6 and adapted to engage the medicated pads 24 carried by the perches 22.

In practice, large fowls will stand upon the pad 11 carried by the base 5 thus causing their feet to come in contact with the substance with which the pad is saturated. The smaller elevated perches 22 are adapted to accommodate smaller fowls so that a similar result will occur. The pad 10 is provided in order that the heads of the fowls will come in contact therewith when feeding out of the trough 18.

It will be seen from the foregoing description taken in connection with the accompanying drawing that the invention provides a feeding device whereby the feet and heads of poultry may be treated for diseases and kept in a disinfected condition, and also that the invention provides a structure which is simple and inexpensive to manufacture.

I claim:—

1. A feeding device comprising a base, standards carried thereby, a swinging frame pivoted to said standards, and a substantially Y-shaped feed receptacle carried by said frame and provided in its lower portion with a plurality of openings on each side thereof.

2. A feeding device comprising a base, standards carried thereby, a frame pivoted to said standards and including a horizontal member, and a feed receptacle carried by said frame and resting upon said horizontal member.

3. A feeding device comprising a base, standards carried thereby, a swinging frame mounted in said standards, a feed receptacle carried by said frame, and a latch pivoted to one of said standards for retaining said frame in a tilted position.

WILLIAM M. HARTT.

Witnesses:
HENRY C. BROWN,
GEORGE W. BROWN.